(12) United States Patent
Takagaki

(10) Patent No.: US 6,743,274 B2
(45) Date of Patent: Jun. 1, 2004

(54) FILTER AND PRODUCTION METHOD THEREOF

(75) Inventor: Takanari Takagaki, Kariya (JP)

(73) Assignee: Toyoda Boshoku Corporation, Kariya (JP)

(*) Notice: Subject to any disclaimer, the term of this patent is extended or adjusted under 35 U.S.C. 154(b) by 108 days.

(21) Appl. No.: 10/032,091

(22) Filed: Dec. 31, 2001

(65) Prior Publication Data

US 2002/0095920 A1 Jul. 25, 2002

(30) Foreign Application Priority Data

Jan. 24, 2001 (JP) ........................ 2001-016325

(51) Int. Cl.[7] .................. B01D 39/16; B01D 46/10
(52) U.S. Cl. ............... 55/502; 55/486; 55/495; 55/497; 55/521; 55/527; 55/DIG. 5; 264/5; 264/6; 264/112; 264/171.18; 264/255; 264/257; 264/DIG. 48; 156/62.2; 156/167; 156/242; 156/308.4
(58) Field of Search .............. 55/486, 487, 492, 55/495, 497, 499, 500, 502, 521, 514, 527, DIG. 5; 264/5, 6, 8, 13, 112, 171.18, 251, 255, 257, DIG. 48; 156/60, 62.2, 62.4, 73.1, 73.5, 73.6, 167, 242, 245, 308.4; 427/180, 244

(56) References Cited

U.S. PATENT DOCUMENTS

| | | | |
|---|---|---|---|
| 4,636,231 A | * | 1/1987 | Thornton et al. .... 264/DIG. 48 |
| 5,674,302 A | * | 10/1997 | Nakayama et al. ...... 55/DIG. 5 |
| 5,888,442 A | | 3/1999 | Kometani et al. |
| 6,293,984 B1 | | 9/2001 | Oda et al. |
| 6,379,438 B1 | * | 4/2002 | Schneider et al. ............. 55/502 |
| 6,454,827 B2 | * | 9/2002 | Takagaki et al. ............. 156/167 |
| 2002/0026776 A1 | * | 3/2002 | McNaughton ................ 55/502 |
| 2002/0129587 A1 | * | 9/2002 | Oda et al. ...................... 55/502 |
| 2002/0132544 A1 | * | 9/2002 | Takagaki ..................... 442/381 |

FOREIGN PATENT DOCUMENTS

| | | | |
|---|---|---|---|
| EP | 0 692 294 A1 | 1/1996 | |
| EP | 0 982 062 A2 | 3/2000 | |
| JP | A 8-24546 | 1/1996 | |
| JP | 8-38834 | * 2/1996 | ........... B01D/39/00 |
| WO | WO 00/18489 | * 4/2000 | ........... B01D/46/52 |

OTHER PUBLICATIONS

U.S. patent application Ser. No. 09/842,708, Takagaki et al., filed Apr. 27, 2001.

* cited by examiner

Primary Examiner—Duane Smith
Assistant Examiner—Jason M. Greene
(74) Attorney, Agent, or Firm—Oliff & Berridge PLC

(57) ABSTRACT

A seal member is attached to a peripheral edge portion of a filter body by being fused to semi-melted fibers that form the filter body when the semi-melted fibers are layered over a forming surface. Therefore, the formation of the filter body and the attachment of the seal member can be simultaneously accomplished.

22 Claims, 5 Drawing Sheets

FILTER AND PRODUCTION METHOD THEREOF

INCORPORATION BY REFERENCE

The disclosure of Japanese Patent Application No. 2001-16325 filed on Jan. 24, 2001, including the specification, drawings and abstract is incorporated herein by reference in its entirety.

BACKGROUND OF THE INVENTION

1. Field of Invention

The invention relates to a filter provided with a seal member attached to a peripheral edge portion of a filter body, and to a production method for the filter.

2. Description of Related Art

A typical filter as shown in FIG. 8 or FIG. 9 is formed by a filter body 52, and a seal member 54 attached to a peripheral edge portion 52e of the filter body 52 (see Japanese Patent Application Laid-Open No. 8-24546). The filter 50 is set in a housing (not shown), with the peripheral edge portion 52e of the filter body 52 and the seal member 54 being clamped by a clamp portion of the housing. The seal member 54 is formed from a rubber or the like so as to have a frame-like shape. An inner peripheral surface of the seal member 54 has a groove 54m as shown in FIG. 9. The seal member 54 is attached to the filter body 52 by fitting the peripheral edge portion 52e of the filter body 52 into the groove 54m. Furthermore, in an example as shown in FIG. 10, a seal member 56 is formed from a felt sheet so as to have a frame-like shape, and the seal member 56 is adhered to a peripheral edge portion 52e of the filter body 52 with an adhesive.

However, due to the construction in which the seal member 54 or 56 is attached to the filter body 52 by fitting or by using an adhesive, the above-described filter 50 needs a step of attaching the seal member 54 or 56 to the filter body 52 after a filter body producing step.

SUMMARY OF THE INVENTION

It is an object of the invention to eliminate the need for the step of attaching a seal member to a filter body after a filter body is produced.

A first aspect of the invention relates to a filter including a filter body, and a seal member attached to a peripheral edge portion of the filter body. In the filter of this aspect of the invention, the seal member is fused to a peripheral edge portion of the filter body, by being fused to fibers that form the filter body when the fibers are in a semi-melted state.

According to the first aspect of the invention, the seal member is fused to the filter body when the fibers that form the filter body are in the semi-melted state. Therefore, the step of attaching a seal member after production of the filter body is eliminated.

A second aspect of the invention relates to a filter including a filter body that is formed by layering semi-melted fibers over a forming surface, and a seal member attached to a peripheral edge portion of the filter body, by being fused to the semi-melted fibers.

According to the second aspect of the invention, when the semi-melted fibers that form the filter body are layered over the forming surface, the semi-melted fibers fuse to the seal member so that the seal member is attached to the filter body. Therefore, the formation of the filter body and the attachment of the seal member to the filter body can be simultaneously accomplished. Therefore, the step of attaching a seal member after production of the filter body is eliminated.

A third aspect of the invention relates to a production method for a filter including the steps of: disposing a seal member over a forming surface; and then forming a filter body by layering semi-melted fibers over the forming surface and the seal member.

Since the semi-melted fibers are layered over the forming surface after the seal member is disposed over the forming surface, the seal member and the semi-melted fibers that form the filter body become fused during formation of the filter body. Therefore, the step of attaching the seal member after production of the filter body can be eliminated.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

Figure 1:
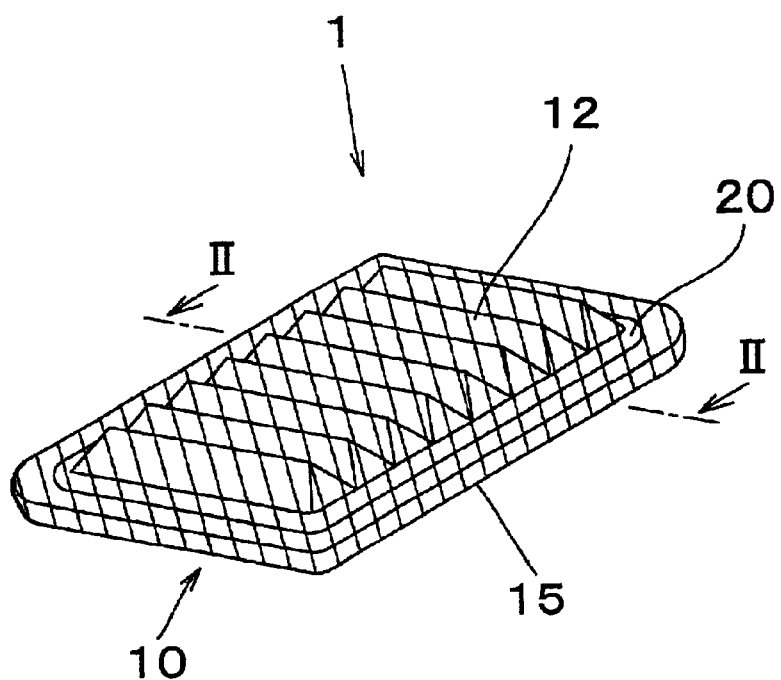
FIG. 1 is a perspective view of a filter in accordance with a first embodiment of the invention.

DETAILED DESCRIPTION OF PREFERRED EMBODIMENTS (First Embodiment)

A filter and a production method for the filter in accordance with a preferred embodiment of the invention will be described below with reference to FIGS. 1 to 4. A filter 1 in accordance with the first embodiment includes a filter body 10 and a seal member 20. The filter body 10 has a filtering portion 12 for filtering air, and a peripheral edge portion 15 formed around the filtering portion 12. The seal member 20 is attached to the peripheral edge portion 15 (see FIG. 1). After installation, the peripheral edge portion 15 of the filter body 10 and the seal member 20 are clamped by a clamp portion of a housing (not shown), so that the filter I is set in the housing.

Figure 2:
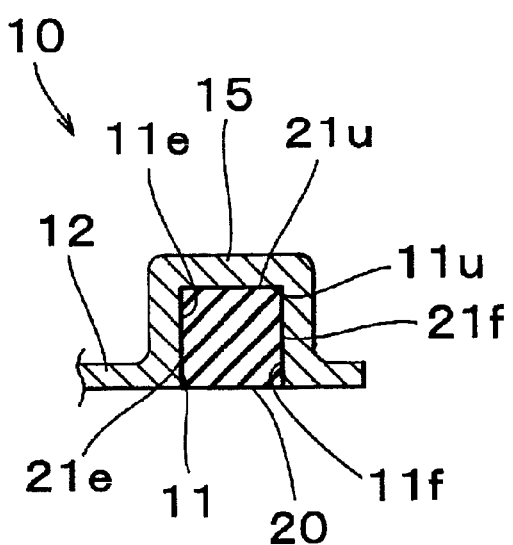
FIG. 2 is a partially sectional view taken along the line II—II of FIG. 1.

The filter body 10 is formed so that the filtering portion 12 and the peripheral edge portion 15 are integrated, by laminating semi-melted fibers on forming surfaces 32f, 32e as described below. In a lower surface of the peripheral edge portion 15 of the filter body 10, a groove portion II that accepts the seal member 20 extends along the peripheral edge portion 15 as shown in FIG. 2.

Figure 3:
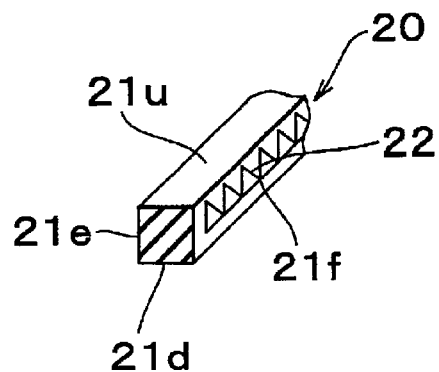
FIG. 3 is a perspective view of a portion of a seal member.

The seal member 20 is formed by, for example, shaping a rubber square bar into a frame configuration. As shown in FIG. 3, the seal member 20 has upper and lower flat surfaces 21u, 21d, and inner and outer peripheral surfaces 21e, 21f having a plurality of protrusions 22. Although the protrusions 22 are triangular in FIG. 3, the shape of the protrusions is not limited to a triangular shape. As shown in FIG. 2, the seal member 20 is fixed to the filter body 10 by locating the seal member 20 in the groove portion 11 of the filter body 10, and fusing the upper surface 21u of the seal member 20 to a ceiling surface 11u of the groove portion 11, and fusing the inner and outer peripheral surfaces 21e, 21f of the seal member 20 to inner and outer side surfaces 11e, 11f of the groove portion 11.

Figure 4:
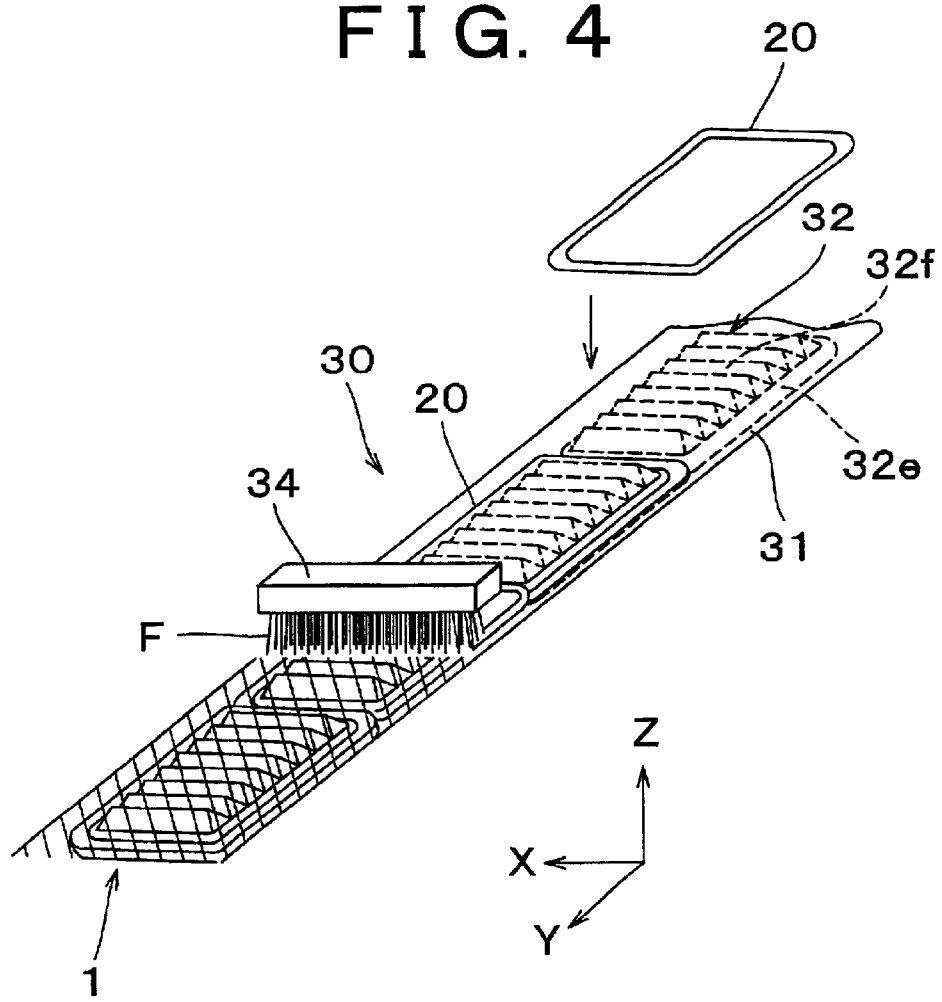
FIG. 4 is a schematic perspective view illustrating a production method for the filter.

Next, a facility for producing the filter 1 will be briefly described with reference to FIG. 4. Furthermore, a method for producing the filter 1 through the use of the facility will be described. A filter production facility 30 includes a horizontal conveyor 31. A plurality of forming dies 32 are placed on the conveyor 31 in such a fashion that the dies are arranged in the direction of conveyance. In the description below, the direction of width of the conveyor 31 is defined as an X direction, the direction of conveyance of the conveyor 31 is defined as a Y direction, and the direction of height of the conveyor 31 is defined as a Z direction. Each forming die 32 is formed by an air-permeable metallic mesh. A filtering portion forming surface 32f and a peripheral edge portion forming surface 32e for forming the peripheral edge portion 15 of the filter body 10 are provided on an upper side of the forming die 32. The filtering portion forming surface 32f is a surface for forming the filtering portion 12 of the filter body 10. The peripheral edge portion forming surface 32e is a surface for forming the peripheral edge portion 15 of the filter body 10. That is, in the first embodiment, the filtering portion forming surface 32f and the peripheral edge portion forming surface 32e of the forming die 32 functions as a forming surface of the invention.

A spinning nozzle 34 is disposed at a position having a predetermined height from the conveyor 31, and extends in a direction of the width of (X direction) of the conveyor 31. The spinning nozzle 34 is, for example, a nozzle that employs a melt blow method. The spinning nozzle 34 extrudes a semi-melted fiber-shaped resin F (hereinafter, referred to as "semi-melted fibers F" or "fibers F") ejected from an extruder (not shown), to the filtering portion forming surface 32f and the peripheral edge portion forming surface 32e of each forming die 32. The fibers F spun out from the spinning nozzle 34 are layered on the filtering portion forming surface 32f and the peripheral edge portion forming surface 32e so as to fuse together and thus form a non-woven fabric.

Next, a production method for the filter 1 will be described. First, the seal member 20 is set (i.e., placed) on the peripheral edge portion forming surface 32e of the forming die 32. Subsequent to the completion of the setting of the seal member 20, the forming die 32 is moved at a constant speed in the Y direction by the conveyor 31. During this operation, a substantially constant amount of the semi-melted fibers F is spun from the spinning nozzle 34. Therefore, as the forming die 32 is moved at the constant speed under the spinning nozzle 34, the semi-melted fibers F are layered on the filtering portion forming surface 32f, the peripheral edge portion forming surface 32e and the seal member 20 in a uniform thickness serially from a leading edge side in the Y direction.

The layered fibers F contact one another, and fuse at the points of contact, so that the layer of fibers F becomes a non-woven fabric, and therefore forms the filter body 10.

Since the seal member 20 is set on the peripheral edge portion forming surface 32e of the forming die 32, the semi-melted fibers F are layered to a substantially constant thickness on the upper surface 21u and the inner and outer peripheral surfaces 21e, 21f of the seal member 20. Therefore, the groove portion 11 for accepting the seal member 20 is formed in the peripheral edge portion 15 during a process in which the peripheral edge portion 15 of the filter body 10 is formed.

The semi-melted fibers F forming the ceiling surface 11u and the inner and outer side surfaces 11e, 11f of the groove portion 11 become fused to the upper surface 21u and the inner and outer peripheral surfaces 21e, 21f, respectively, of the seal member 20, so that the seal member 20 becomes fixed to the peripheral edge portion 15 of the filter body 10. That is, the formation of the filter body 10 and the attachment of the seal member 20 to the filter body 10 are simultaneously accomplished. Then, the filter body 10 is removed from the forming die 32. Thus, the filter 1 provided with the seal member 20 attached to the peripheral edge portion 15 of the filter body 10 is formed. The inner and outer peripheral surfaces 21e, 21f of the seal member 20 have protrusions 22 as described above. Therefore, the protrusions 22 engage with the fibers F of the filter body 10, thus enhancing the binding between the seal member 20 and the filter body 10. That is, in this embodiment, the protrusions 22 function as an engaging portion.

According to the production method for the filter 1 in accordance with this embodiment, when the semi-melted fibers F are layered on the filtering portion forming surface 32f and the peripheral edge portion forming surface 32e so as to form the filter body 10, the fibers F are fused to the seal member 20, whereby the seal member 20 is attached to the filter body 10. Thus, the formation of the filter body 10 and the attachment of the seal member 20 can be simultaneously accomplished. Hence, the seal member attaching step after production of the filter body 10 is eliminated, and therefore the production cost of the filter 1 can be reduced.

Although the material of the seal member 20 is a rubber in the above-description, it is also possible to use a material other than rubber as long as the material is fusable to the semi-melted fibers F. For example, a felt or the like may also be used as a material of the seal member 20. Furthermore, the fusion between the seal member 20 and the fibers F can be accelerated by heating the seal member 20 to a predetermined temperature before setting the seal member 20 on the peripheral edge portion forming surface 32e of the forming die 32.

(Second Embodiment)

Figure 5:
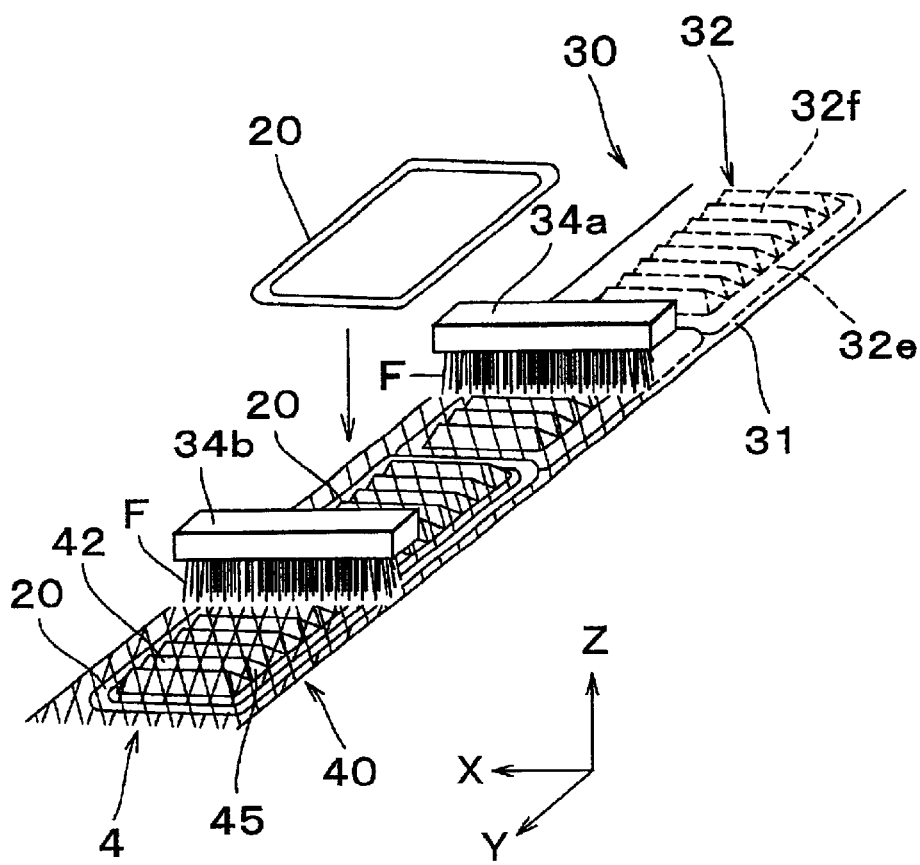
FIG. 5 is a schematic perspective view illustrating a filter production method in accordance with a second embodiment of the invention.

A filter and a production method for the filter in accordance with a second embodiment of the invention will be described with reference to FIGS. 5 and 6. A filter 4 in accordance with this embodiment is formed by a filter body 40 and a seal member 20, similarly to the filter 1 of the first embodiment. The filter body 40 has a filtering portion 42 for filtering air, and a peripheral edge portion 45 formed around the filtering portion 42. The seal member 20 is attached to the peripheral edge portion 45 (see FIG. 6). The seal member 20 is substantially the same as the seal member 20 described above with the first embodiment, and is therefore represented in the drawings by the same reference number, and will not be described further.

Figure 6:
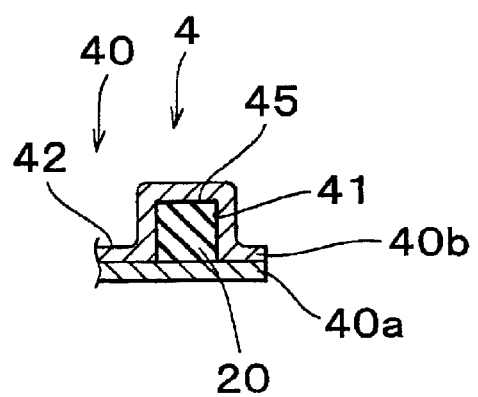
FIG. 6 is a sectional view of a peripheral edge portion of a filter made by the FIG. 5 process.

The filter body 40 has a two-layer structure of a first non-woven fabric 40a and a second non-woven fabric 40b as shown in FIG. 6. The seal member 20 is clamped between the first non-woven fabric 40a and the second non-woven fabric 40*b*. More specifically, a downward facing groove portion 41 is formed in the second non-woven fabric 40*b*. The opening of the groove portion 41 is closed by the first non-woven fabric 40*a*, with the seal member 20 being contained in the groove portion 41. Thus, the seal member 20 is embedded in the peripheral edge portion 45 of the filter body 40. Therefore, it is possible to prevent the seal member 20 from falling apart from the filter body 40. The seal member 20 contained in the groove portion 41 of the second non-woven fabric 40*b* becomes fused with the fibers F forming the second non-woven fabric 40*b*, and is thus fixed to the fibers F forming the second non-woven fabric 40*b*.

Next, a facility for producing the filter 4 will be briefly described with reference to FIG. 5. Furthermore, a method for producing the filter 4 through the use of the facility will be described. A filter producing facility 30 has two spinning nozzles 34*a* and 34*b* that are disposed in the direction of conveyance of a conveyor 31. Therefore, semi-melted fibers F are extruded at two sites. Other constructions of the second embodiment are substantially the same as those of the filter production facility 30 of the first embodiment, and will not be described again. In the below description, the upstream-side spinning nozzle is termed first spinning nozzle 34*a*, and the downstream-side spinning nozzle is termed second spinning nozzle 34*b*.

A production method for the filter 4 will next be described.

First, the conveyor 31, on which the forming die 32 is set, is driven to move the forming die 32 at a constant speed in the Y direction. During this operation, a substantially constant amount of the semi-melted fibers F is spun from the first spinning nozzle 34*a*. Therefore, as the forming die 32 is moved at the constant speed under the first spinning nozzle 34*a*, the semi-melted fibers F are layered on the filtering portion forming surface 32*f* and the peripheral edge portion forming surface 32*e* of the forming die 32 in a uniform thickness serially from a leading edge side in the Y direction. The layered fibers F contact one another, and fuse at the points of contact, so that the layer of fibers F become the first non-woven fabric 40*a*. Thus, in the second embodiment, the forming surface can be considered to be the first non-woven fabric 40*a*.

Next, the seal member 20 is set on a peripheral edge portion of the first non-woven fabric 40*a*, and then the first non-woven fabric 40*a*, the forming die 32 and the like continue to be moved at the constant speed in the Y direction. During this operation, a substantially constant amount of semi-melted fibers F is spun from the second spinning nozzle 34*b*. Therefore, as the forming die 32 and the like are moved at the constant speed under the second spinning nozzle 34*b*, the semi-melted fibers F are layered on an upper surface of the first non-woven fabric 40*a* in a uniform thickness serially from a leading edge side in the Y direction. The layered fibers F contact one another, and fuse at the points of contact, so that the layer of the fibers F becomes the second non-woven fabric 40*b*.

Furthermore, the fibers F forming the second non-woven fabric 40*b* become fused to the fibers F forming the first non-woven fabric 40*a* as well as the seal member 20. The filter body 40 is thus formed. Simultaneously with the formation of the filter body 40, the seal member 20 is embedded in the peripheral edge portion 45 of the filter body 40. Since the seal member 20 is clamped between the first non-woven fabric 40*a* of the filter body 40 and the second non-woven fabric 40*b* of the filter body 40, it is possible to reliably prevent the seal member 20 from falling apart from the filter body 40.

Although the first non-woven fabric 40*a* and the second non-woven fabric 40*b* are formed by the first spinning nozzle 34*a* and the second spinning nozzle 34*b* in the second embodiment, respectively, it is also possible to move the forming die 32 forward and rearward under a single spinning nozzle 34 through the use of the conveyor 31, and to form the first non-woven fabric 40*a* during a forward conveyance, and to form the second non-woven fabric 40*b* during a reverse conveyance. In this embodiment, the first non-woven fabric 40*a* is formed by using the forming die 32 and the first spinning nozzle 34*a*. However, as a modification of this embodiment, it is conceivable to place a pre-formed filter (a first non-woven fabric), that is fusable to the fibers F, on the belt of a belt conveyor on which the forming die is not placed, and place a seal member on the first non-woven fabric, and then spin the semi-melted fibers F onto the first non-woven fabric. In this modification, too, the forming surface is formed by the first non-woven fabric. Furthermore, the first non-woven fabric may be replaced by an air-permeable member other than a non-woven fabric (preferably, a member that functions as a filter).

(Third Embodiment)

Figure 7:
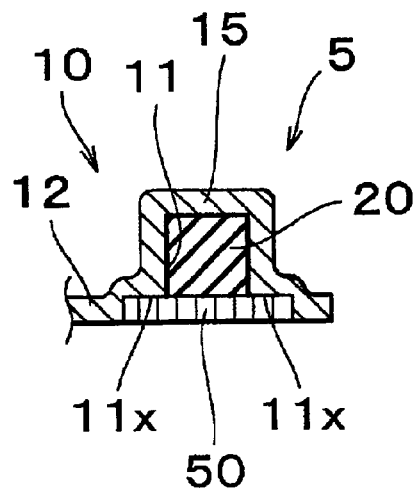
FIG. 7 is a sectional view of a peripheral edge portion of a filter in accordance with a third embodiment of the invention.
Figure 8:
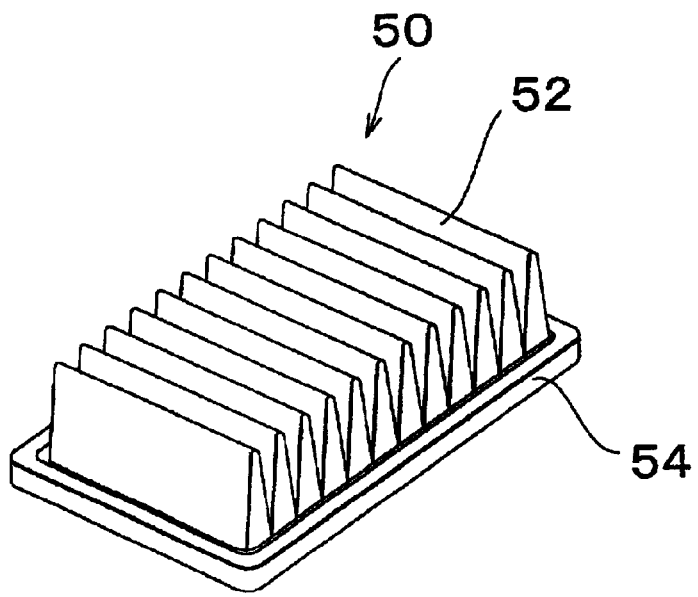
FIG. 8 is a perspective view of a filter made by one conventional technique.
Figure 9:
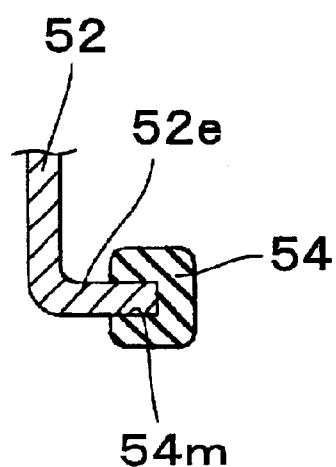
FIG. 9 is a sectional view of a peripheral edge portion of the FIG. 8 filter.
Figure 10:
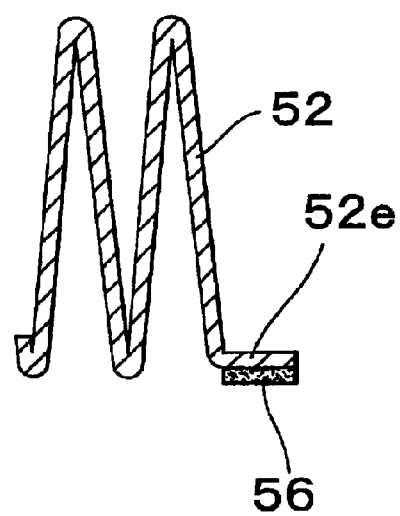
FIG. 10 is a sectional view of a peripheral edge portion of a filter made by another conventional technique.

A filter and a production method for the filter in accordance with a third embodiment of the invention will be described with reference to FIG. 7. A filter 5 in this embodiment is different from the filter of the first embodiment in that an opening of a groove portion 11 formed in the filter body 10 in the first embodiment is closed in the third embodiment, so that the seal member 20 contained in the groove portion 11 is less likely to fall apart in the third embodiment. Except the closed portion, the filter 5 is substantially the same as the filter 1 of the first embodiment.

A lid plate 50 is used as a member for covering the opening of the groove portion 11 of the filter body 10. The lid plate 50 is a belt-like plate formed from a non-woven fabric, a filter paper, a resin film or the like, and is wider than the seal member 20. The lid plate 50 is fused to fibers F that form the filter body 10, at a position of an opening edge 11*x* of the groove portion 11, and is therefore fixed to the filter body 10. Thus, the opening of the groove portion 11 of the filter body 10 is closed by the lid plate 50, thereby preventing the seal member 20 contained in the groove portion 11 from falling apart from the filter body 10.

A production method for the filter 5 will be described with reference to FIG. 4. A filter production facility in this embodiment is substantially the same as the filter production facility 30 described above in conjunction with the first embodiment, and will not be described again.

First, the lid plate 50 is set on the peripheral edge portion forming surface 32*e* of the forming die 32. Next, the seal member 20 is set on the lid plate 50. Then, the conveyor 31 is driven to move the forming die 32 at a constant speed in the Y direction. A substantially constant amount of semi-melted fibers F is spun from the spinning nozzle 34. Therefore, as the forming die 32 is moved at the constant speed under the spinning nozzle 34, the semi-melted fibers F are layered on the filtering portion forming surface 32*f* and the peripheral edge portion forming surface 32*e* of the forming die 32, and the seal member 20 and the lid plate 50, in a constant thickness serially from a leading edge side in the Y direction.

The layered fibers F contact one another, and fuse at the points of contact, so that the layer of fibers F becomes a non-woven fabric, and therefore forms the filter body 10. The points of contact between the fibers F and the seal member 20 and the points of contact between the fibers F and the lid plate 50 are joined respectively, and the seal member 20 is fixed to the filter body 10. The opening of the groove portion 11 of the filter body 10 containing the seal member 20 is closed by the lid plate 50. The lid plate 50 may cover the entire opening of the groove portion 11, or may cover the opening partially in a circumferential direction.

In the third embodiment, the lid plate 50 is disposed on the peripheral edge portion forming surface 32e of the forming die 32, and the seal member 20 is disposed on the lid plate 50, and the fibers F are layered thereon so as to form the filter body 10. However, it is also possible to layer fibers for forming a filter body on the filtering portion forming surface and the peripheral edge portion forming surface of a forming die, to place a seal member and place a lid plat thereon, and to fuse the seal member and the fibers F and the lid plate.

The first to third embodiments employ the seal member 20 having protrusions 22 on the inner peripheral surface 21e and the outer peripheral surface 21f. However, the seal member 20 may be firmly fixed to the filter body 10 without a need for the protrusions 22, particularly if the seal member 20 is pre-heated so that the seal member 20 fuses to the fibers F sufficiently. Furthermore, although the sectional shape of the seal member 20 is a quadrangle in the foregoing embodiments, the sectional shape of the seal member 20 is not limited to a quadrangle. For example, the sectional shape of the seal member 20 may be a polygonal shape other than the quadrangle shape, or a circular shape, an elliptical shape or the like.

As for the forming surface, a portion thereof (e.g., a peripheral edge portion thereof) may be formed by a forming surface of a forming die, and another portion thereof (e.g., a filtering portion) may be formed by a non-woven fabric.

Furthermore, the seal member may be disposed on the forming surface as in the first and second embodiments, or may be disposed on a member fusable to semi-melted fibers which is disposed on the forming surface as in the third embodiment.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A filter comprising:
   a filter body formed by layering semi-melted fibers over a forming surface; and
   a seal member attached to a peripheral edge portion of the filter body, by being fused to the semi-melted fibers,
   wherein the seal member has inner and outer peripheral surfaces, and the semi-melted fibers are fused to the inner and outer peripheral surfaces of the seal member.
2. A filter according to claim 1, wherein the seal member has an engaging portion that engages with the semi-melted fibers.
3. A filter according to claim 1, wherein at least a portion of the forming surface is formed by a member that is fusable to the semi-melted fibers.
4. A filter according to claim 3, wherein the filter body includes a filtering portion, and
   the member fusable to the semi-melted fibers forms a portion of the filtering portion.
5. A filter according to claim 3, wherein the member fusable to the semi-melted fibers is a non-woven fabric.
6. A filter according to claim 3, wherein at least a portion of the seal member is provided between the semi-melted fibers and the member fusable to the semi-melted fibers.
7. A filter according to claim 1, wherein at least a portion of the forming surface is a forming surface of a die for forming the filter.
8. A filter according to claim 1, further comprising a member that is fusable to the semi-melted fibers and that is disposed on the forming surface,
   wherein at least a portion of the seal member is provided between the semi-melted fibers and the member fusable to the semi-melted fibers.
9. A production method for a filter, comprising:
   disposing a seal member over a forming surface; and
   subsequently forming a filter body by layering semi-melted fibers over the forming surface and the seal member.
10. A production method for a filter according to claim 9, further comprising forming the forming surface made by a member fusable to the semi-melted fibers before disposing the seal member over the forming surface.
11. A production method for a filter according to claim, 10 wherein the member fusable to the semi-melted fibers is a non-woven fabric.
12. A production method for a filter according to claim 11, wherein the filter body has a filtering portion, and a portion of the filtering portion is formed by the non-woven fabric.
13. A production method for a filter according to claim 11, wherein the non-woven fabric is formed by layering the semi-melted fibers on a forming die before disposing the seal member over the forming surface.
14. A production method for a filter according to claim 9, further comprising disposing a member that is fusable to the semi-melted fibers on the forming surface before disposing the seal member over the forming surface,
   wherein the seal member is disposed on the member fusable to the semi-melted fibers.
15. A production method for a filter according to claim 14, wherein the member fusable to the semi-melted fibers is a plate member.
16. A production method for a filter according to claim 9, wherein the seal member is in a heated state when the seal member is disposed over the forming surface.
17. A production method for a filter according to claim 9, wherein the forming surface is a forming die that is not a part of the filter.
18. A filter made by the method of claim 9.
19. A filter comprising:
   a filter body; and
   a seal member fused to a peripheral edge portion of the filter body, by being fused to fibers that form the filter body when the fibers are in a semi-melted state,
   wherein the seal member has inner and outer peripheral surfaces, and the semi-melted fibers are fused to the inner and outer peripheral surfaces of the seal member.
20. A filter according to claim 19, wherein the seal member has an engaging portion that engages with the semi-melted fibers.
21. A filter comprising:
   a filter body formed by layering semi-melted fibers over a forming surface; and
   a seal member attached to a peripheral edge portion of the filter body, by being fused to the semi-melted fibers,
   wherein at least a portion of the forming surface is formed by a member that is fusable to the semi-melted fibers, and at least a portion of the seal member is provided between the semi-melted fibers and the member fusable to the semi-melted fibers.

22. A filter comprising:

a filter body formed by layering semi-melted fibers over a forming surface;

a seal member attached to a peripheral edge portion of the filter body, by being fused to the semi-melted fibers; and a member that is fusable to the semi-melted fibers and that is disposed on the forming surface, wherein at least a portion of the seal member is provided between the semi-melted fibers and the member fusable to the semi-melted fibers.

* * * * *